(No Model.) 5 Sheets—Sheet 1.

J. R. ROGERS.

MACHINE FOR MAKING PRINTING SURFACES.

No. 534,917. Patented Feb. 26, 1895.

Witnesses:

Amelia J. Williams

G. W. Rea.

John R. Rogers Inventor.

THE NORRIS PETERS CO., PHOTO-LITHO., WASHINGTON, D. C.

(No Model.)

5 Sheets—Sheet 2.

J. R. ROGERS.

MACHINE FOR MAKING PRINTING SURFACES.

No. 534,917. Patented Feb. 26, 1895.

Witnesses:

Amelia J. Williams.

G. W. Rea.

Inventor.

John R. Rogers

THE NORRIS PETERS CO., PHOTO-LITHO., WASHINGTON, D. C.

(No Model.)

5 Sheets—Sheet 3.

J. R. ROGERS.

MACHINE FOR MAKING PRINTING SURFACES.

No. 534,917. Patented Feb. 26, 1895.

Witnesses:

Amelia J. Williams,

G. H. Rea.

Inventor.

John R. Rogers

THE NORRIS PETERS CO., PHOTO-LITHO., WASHINGTON, D. C.

(No Model.) 5 Sheets—Sheet 4.
J. R. ROGERS.
MACHINE FOR MAKING PRINTING SURFACES.
No. 534,917. Patented Feb. 26, 1895.
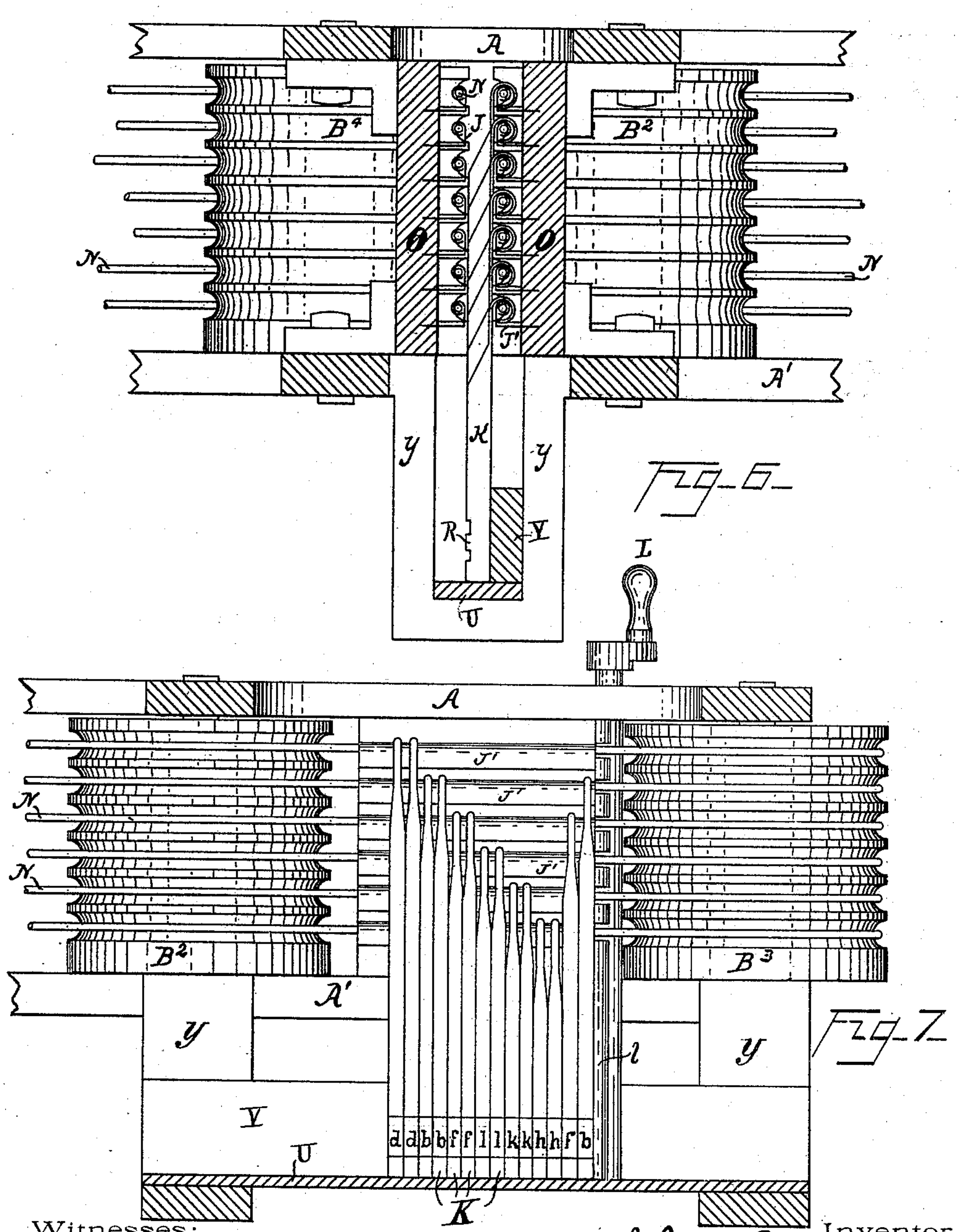
Fig-6- Fig-7-
Witnesses:
Amelia J. Williams,
G. W. Rea.
Inventor.
John R. Rogers
THE NORRIS PETERS CO., PHOTO-LITHO., WASHINGTON, D. C.

(No Model.)
5 Sheets—Sheet 5.
J. R. ROGERS.
MACHINE FOR MAKING PRINTING SURFACES.
No. 534,917. Patented Feb. 26, 1895.
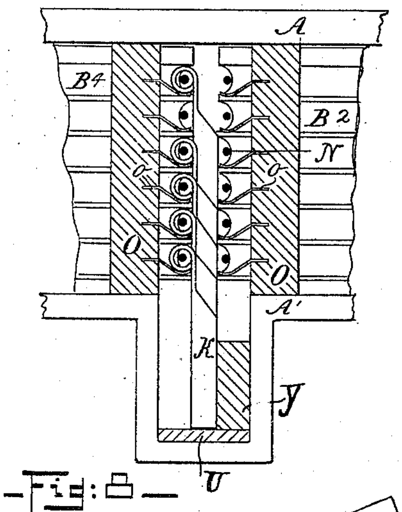
Fig: 8
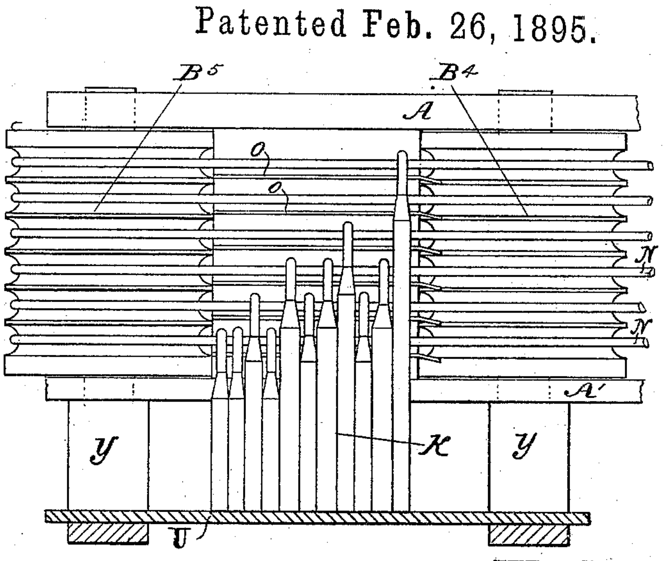
Fig: 9
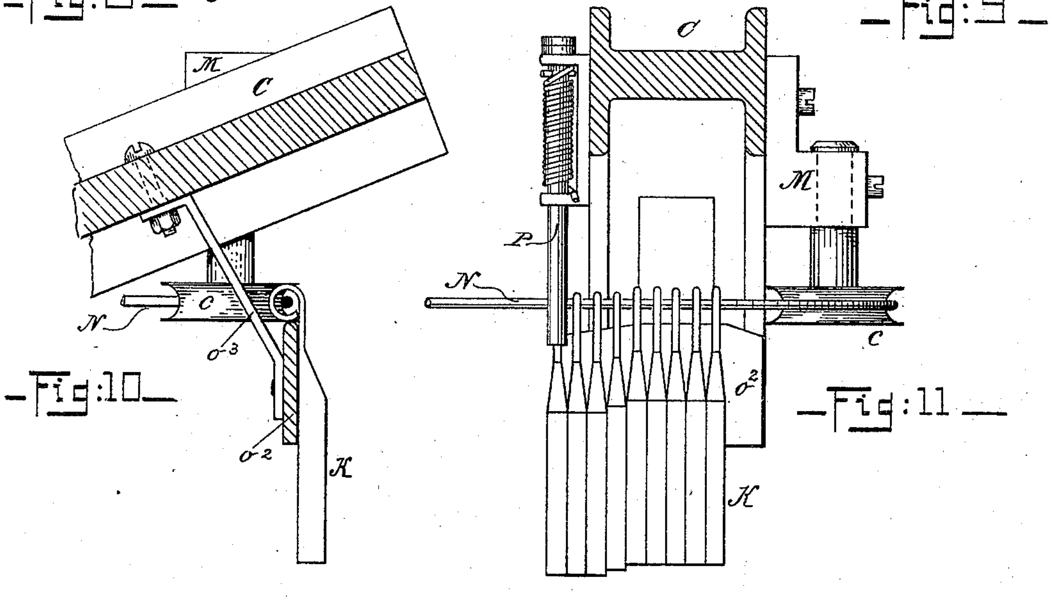
Fig: 10, Fig: 11
Witnesses:
Amelia J. Williams
G. H. Rea.
Inventor.
John R. Rogers
THE NORRIS PETERS CO., PHOTO-LITHO., WASHINGTON, D. C.

UNITED STATES PATENT OFFICE.

JOHN R. ROGERS, OF DETROIT, MICHIGAN, ASSIGNOR TO THE ROGERS TYPOGRAPHIC COMPANY, OF MICHIGAN.

MACHINE FOR MAKING PRINTING-SURFACES.

SPECIFICATION forming part of Letters Patent No. 534,917, dated February 26, 1895.

Application filed October 10, 1894. Serial No. 525,510. (No model.)

*To all whom it may concern:*

Be it known that I, JOHN R. ROGERS, of Detroit, in the county of Wayne and State of Michigan, have invented a new and useful Improvement in Machines for Making Printing-Surfaces, of which the following is a specification.

My invention consists in an improvement in machines for making printing surfaces, hereinafter fully described and claimed.

Figure 1:
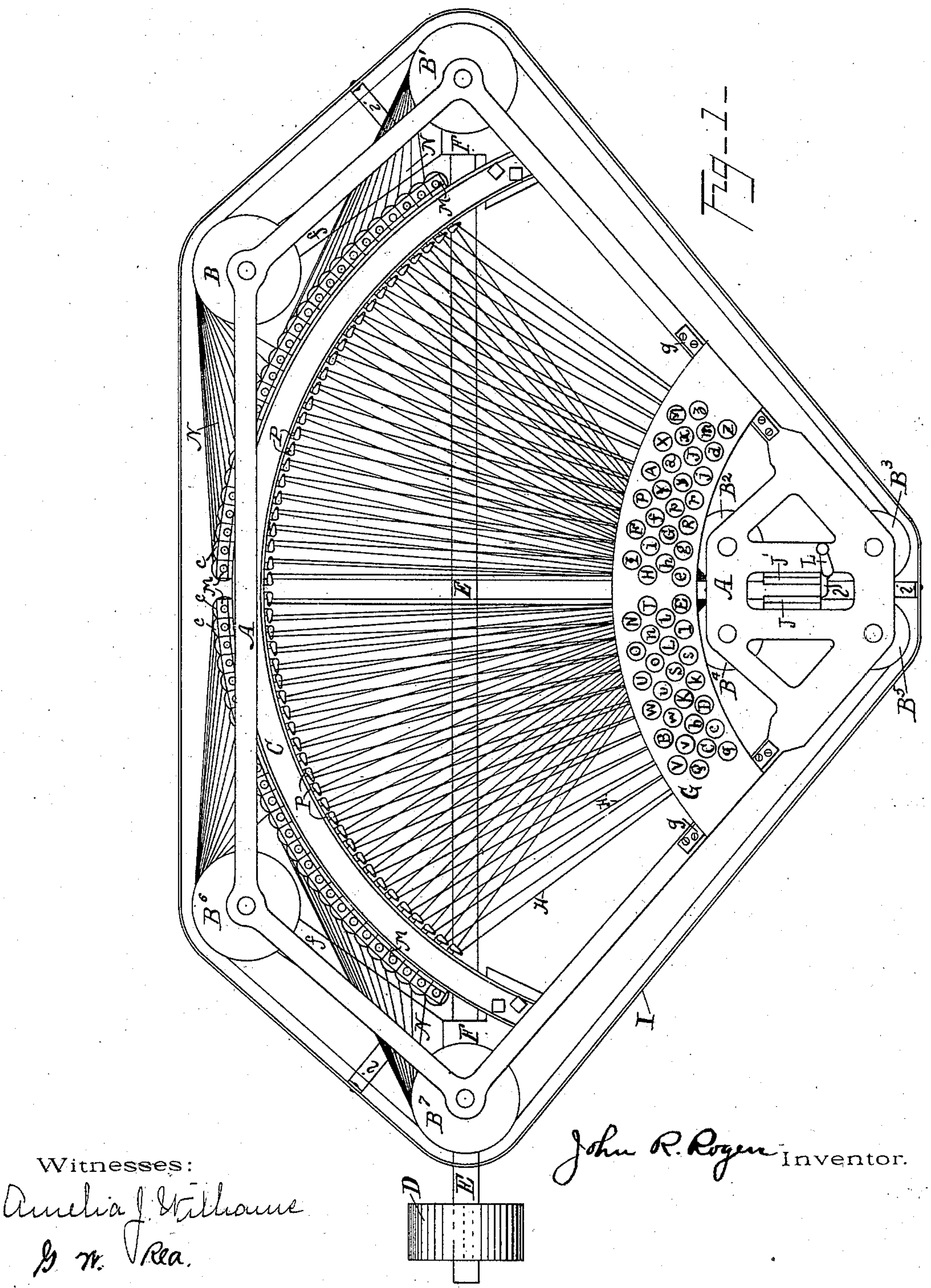
Figure 2:
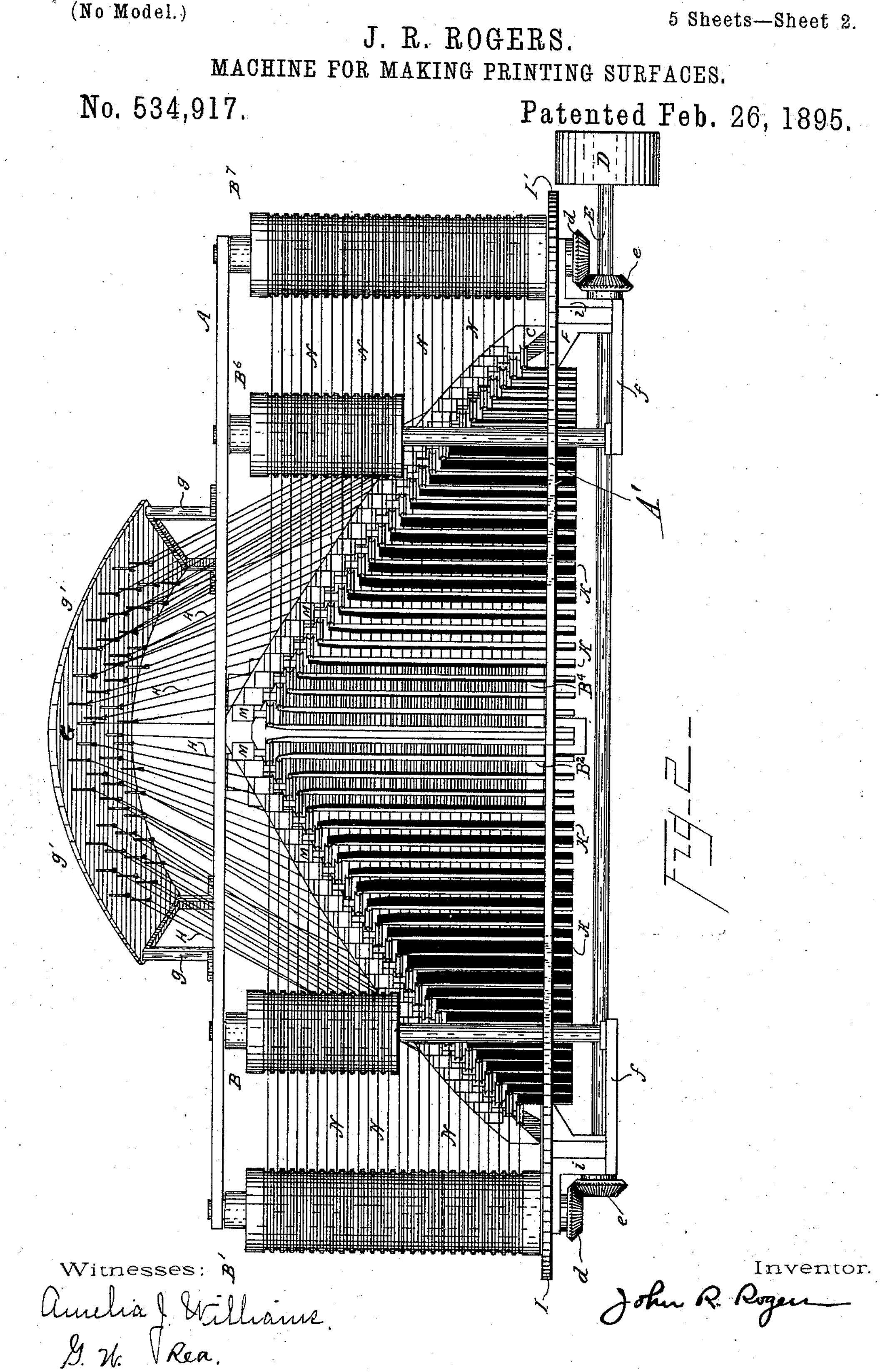
Figure 5:
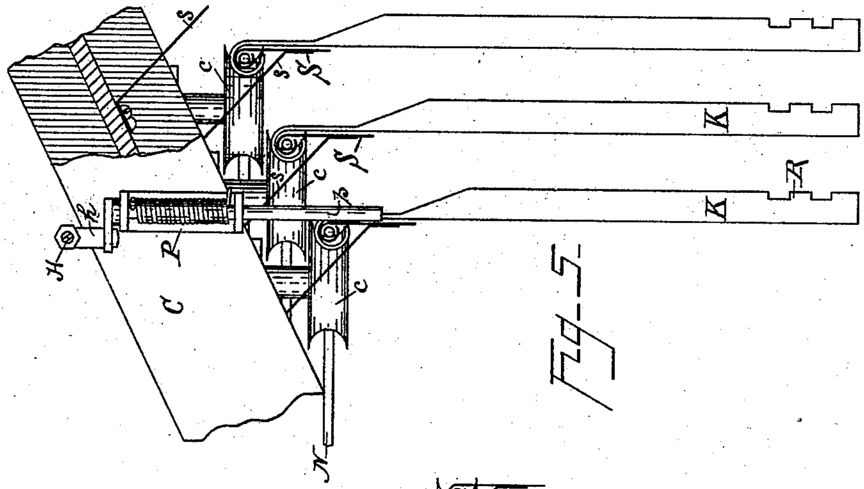
Figure 4:
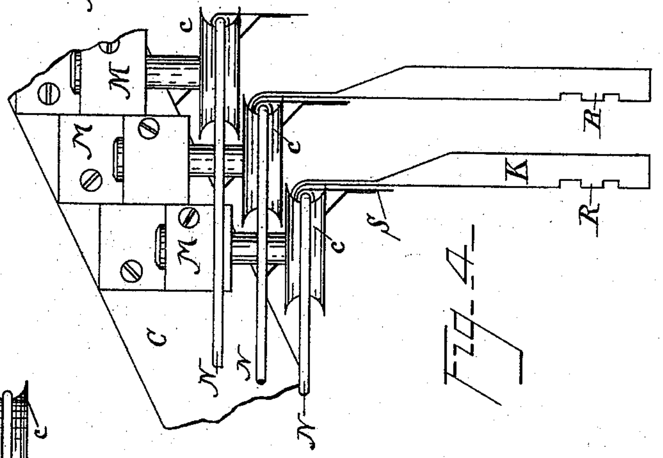
Figure 3:
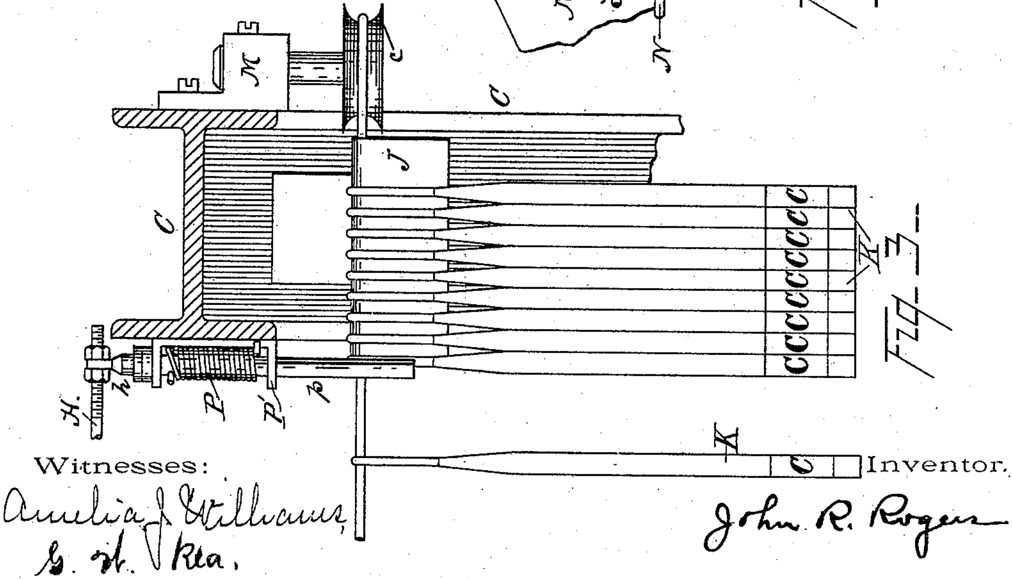

Figure 1 is a top plan view. Fig. 2 is a rear elevation; Fig. 3 a side elevation, of the storage point, partly in section; Figs. 4 and 5, side elevations of part of the carrying mechanism; Fig. 6, a transverse vertical section, and Fig. 7 a longitudinal vertical section through the assembling point; Figs. 8 and 9, views similar to Figs. 6 and 7; Fig. 10, a section through part of the storage mechanism, and Fig. 11 a side view, Figs. 6 and 7 showing one form of track, Figs. 8 and 9 another form, and Figs. 10 and 11 still another form.

My invention relates only to mechanism for assembling in line a series of dies, from which either a cast may be made or an impression in soft metal taken, and has nothing whatever to do, either with the casting operation or the impression operation, so that the drawings only show, and the descriptions only relate to, the mechanism for assemblage and distribution.

A and A′ represent two skeleton frames, secured together at a certain distance apart and which are, as shown in Fig. 1, approximately the shape of a sector of a circle. At the meeting point of the two radii or converging sides, these frames are extended inward so as to form bearings for the pintles of the four grooved pulleys, $B^2$, $B^3$, $B^4$ and $B^5$. In the outer corners of the frames are pivoted grooved pulleys B′ and $B^7$, and each of these pulleys has one half as many grooves as there are to be characters used in the machine.

B and $B^6$ represent grooved idler pulleys journaled in the rear of the frames A and $A^8$, simply to serve as guides for a portion of the belts, and these pulleys need not have as many grooves as the others, and may be entirely dispensed with by carrying the pulleys B′ and $B^7$ farther back from the pulleys $B^3$ and $B^5$.

It will be noticed that the four pulleys $B^2$ and $B^3$ on one side, and $B^4$ and $B^5$ on the other side, are so placed as to inclose a parallelogram between them so that all the belts running upon pulleys $B^2$ and $B^3$ will lie vertically one above the other, and be parallel with the belts running over the pulleys $B^4$ and $B^5$, which also, between these two pulleys, lie vertically one above the other.

C represents a frame which for compactness I make in the shape of a bow, but inclined upward from both ends to its center, its ends being secured to the frame A. Of course, this frame C may be varied in shape, and may be horizontal, but it makes a more compact machine, and makes all the belts more nearly equal in length between the points of storage and of assemblage, to make this frame C in the shape indicated in the drawings, and for these reasons I prefer this shape, though it is not an important feature of my invention.

*c* represents a series of small grooved pulleys, each of which is journaled on a pin fastened in a plate M secured to frame C, and and these plates M may be made adjustable, for alignment.

N N represent endless belts which are distributed equally on the two sides of the center line running from the center of the frame A through the center of the frame C. This is the best arrangement, but of course the equal distribution of these belts on the two sides of the center is a mere detail of construction, which may be departed from.

All the belts on one side of the center line, for example, at the right, Fig. 1, pass from their respective pulleys *c* to the grooves in the pulley $B^2$, thus covering approximately half of a sector of a circle, then pass around pulley $B^3$, around pulley B′, from which part of them lead directly to the small pulley *c*, while the others pass around the idler pulley B, and thence to their respective pulleys *c*, the idler being put in to distribute the belts to their respective pulleys without crowding or interference, and the arrangement of the other half is exactly similar.

E represents a shaft running under frame A′ carrying at one end a belt pulley D, and carrying two bevel gears *e*, which mesh with similar bevel gears *d* on the lower end of the pintles of the pulleys B′ and $B^7$, so that when shaft E is rotated, pulleys B′ and $B^7$ are rotated at equal speed, but in opposite directions, and thereby all the belts which pass over said pulleys B′ and $B^7$ are set in motion. Shaft E is journaled in brackets F, secured to frame A′.

K K represent thin bars, each of which is formed at its upper end with an eye, large enough to loosely embrace one of the belts N, and I prefer to make this eye considerably larger in internal diameter than the belt. On one edge of each bar, at the point R, is stamped a matrix or is formed a male die, this being indicated in Fig. 3 by the capital letter C, and in Fig. 7 by a series of lower case letters. Of course the thickness of the bars K will vary with the characters carried upon them, but all the bars K on any one belt N will carry the same character. It is evident that when belt N passes through the eye of one of these bars K, and the bar is left uncontrolled, it will hang on the belt, and if the belt is in motion, will be carried by it, passing between pulleys $B^2$ and $B^4$, then between pulleys $B^3$ and $B^5$, and out and back in one direction or the other around pulleys B′ and $B^7$, so that the bar will tend to describe this circuit, so long as the belt is in motion. I therefore provide retaining and escape mechanism at that part of each belt near frame C, so that the belt may rotate without carrying any of the bars, unless a bar is freed by the escapement from the retaining mechanism, and I also provide retaining and release mechanism in the parallelogram inclosed by the four pulleys $B^2$, $B^3$, $B^4$ and $B^5$. The retaining and escape mechanism is substantially the same shown and described in Patent No. 437,141, dated September 23, 1890, and consists of a vertical shaft *p*, journaled in a yoke P′ fastened to frame C and encircled within said yoke by a coil spring P holding it normally in a fixed position. Below yoke P′, shaft *p* has formed in one side of it a vertical groove a trifle larger than the rounded end of one of the bars K, and on its upper end is provided with a crank *h*, to which is adjustably secured one end of a rod H, the other end of which leads to a finger key set in the key-board G, secured by lug *g* to frame A, the operation being that when a finger key is depressed, rod H, through the medium of crank *h*, rotates shaft *p* against the resistance of the spring P and the groove in said shaft moves forward one of the bars K, as illustrated in Fig. 3 and at the same time prevents any of the other bars K from moving, and when the finger key is released the spring P brings the rod *p* back to its normal position, ready to release another bar, all as fully described in my said former patent.

The bars K are of different lengths, as shown in Fig. 7, so that when a number of them are assembled, the point R, at which the matrix or type is carried, will be at about the same level, so that they may be aligned at exactly actly the same level.

When a bar K is released by depressing its finger key, it is carried by the belt by reason of the frictional contact toward the pulley $B^2$, or $B^4$, as the case may be, and when it passes through the parallelogram inclosed by pulleys $B^2$, $B^3$, $B^4$ and $B^5$, it strikes against a lug *l*, carried on a vertically journaled crank shaft L, and is checked, the next bar coming in being checked by the bar already in position, and so on, until a line is assembled. When it is desired to distribute said bars, they are released by moving the crank shaft L by hand, so as to draw lug *l* out of the path of the bars K when the belts carry all the bars back until they are stopped by striking against their respective series of bars already held in place by the escapement and retaining mechanism. If it be desirable, as will often be the case, to make the bars K longer than the distance between the belts on which they are carried and frame A′, said frame A′ may be carried down at its forward end, as shown at Y, Figs. 6, 8 and 9, and these downward extensions may carry a foot plate U. I represents a light iron frame extending around frame A′ to guide the lower ends of the bars K, and prevent their being thrown outwardly by centrifugal force, as they pass around the pulleys. It is supported by brackets *i*, extending outwardly from brackets F. *f* represents bars carried on the lower end of the brackets F, in which the pintles of the pulleys B and $B^6$ are journaled. While said bars K may always hang on the belt N, I prefer, at the points of storage and assemblage, to so support said bars that the belt N will run through the eyes thereof without frictional contact, thus avoiding any undue wear upon said belt. This may be done by providing at those points a track upon which said bars can rest, and I have illustrated in the drawings three forms thereof.

In Figs. 3, 6 and 7, these tracks consist of a light piece of sheet metal J or J′, which in Figs. 6 and 7 are secured in an upright O, extending between frames A and A′, extending outwardly from said upright, then extending upwardly, and the upper ends are curled over so as to pass around and nearly encircle a belt, and in this form the eye of bar K cannot be entirely closed, though it may be so nearly closed that the bar is still a "tied" matrix, like the matrix bar of my former patent, and is not a "free" matrix, like that of Patent No. 317,828. As a bar K is carried along by its belt N, it readily jumps onto its track J or J′, and slides along said track until it is stopped either by another bar or by some retaining mechanism, and at the point of storage, in the form which I have chosen to illustrate my invention, this track may be sufficiently inclined to insure the forward bar always lying against shaft *p*. A fine slot may be cut in the top of the tubular part of track T, so that the belt will give the bars hanging on said track slight impulses.

In Figs. 8 and 9, the tracks marked *o* are made of sheet metal shaped like a gutter, and carried on uprights, O, and the lower side of the eye of the bar K rests in the gutter.

In Figs. 10 and 11 the track is a bar $o^2$, supported by a hanger $O^3$ from frame C on which rests bar K, as shown in Fig. 10. The track $o^2$ may be slightly inclined as shown in Fig. 11. When a series of matrices has been assembled, and is to be distributed, if the track used is like that of Fig. 7 it is necessary after swinging crank shaft L to push the entire line of matrices off from the track onto the belts which is done by a slight touch of the fingers, when they are immediately carried around and distributed. With the other forms of tracks, this is not necessary.

I have said nothing about spacers, and have shown no mechanism for assembling them, but they may be of the double wedge type, either in accordance with my former patent or the Schuckers patent, No. 474,306, and may be assembled at proper spaces in the line, as shown in my former patent, or by any suitable mechanism. If of the Schuckers type, they may be assembled and distributed by an endless belt as are the bars K, the movable wedge being provided with a slot to permit its being forced upward.

While I very much prefer the arrangement which I have illustrated and described, it is evident that the form of machine may be materially changed, that the pulleys $B^4$, $B^5$, $B^6$ and $B^7$ may be entirely omitted, and all the belts put on the other pulleys, and it is also evident that idler pulleys may be put in at any desired points to support the belts in their travel.

I believe that I am the first man to combine "tied" bar carrying either a matrix or type, with a continuously moving carrier, whose motion serves to both "assemble" and "distribute" such bar, and that my invention covers this combination in any and every form.

What I claim as my invention, and desire to secure by Letters Patent, is—

1. In a machine for making printing surfaces, the combination with an endless moving belt of a bar carrying a type or matrix loosely hung on said belt, and means for holding said bar stationary while the belt is in motion.

2. In a machine for making printing surfaces, the combination with an endless moving belt of a bar carrying a type or matrix loosely hung on said belt, and means for holding said bar stationary at either of two points, while said belt is in motion.

3. In a machine for making printing surfaces, the combination with an endless moving belt of a type or matrix bar hung loosely thereon, escape mechanism for retaining or releasing said bar at one point of its travel, while the belt is in motion, and retaining mechanism for arresting said bar when released, at another point in its travel.

4. In a machine for making printing surfaces, the combination with a series of endless moving belts which at one point of their travel lie in the same vertical plane, of a series of type or matrix bars loosely hung on said belts, each bar on a belt bearing the same character, escape mechanism operated by finger keys for retaining and releasing the bars on each belt at one point of their travel, and retaining mechanism for arresting all of said bars, when they arrive at said vertical plane.

5. In a machine for making printing surfaces, the combination with a series of endless moving belts of a series of type or matrix bars hung on said belts by eyes of greater internal diameter than said belts, escape mechanism operated by a finger key for each belt, at one point in its travel, a stationary track in advance of said escape mechanism to hold said bars practically out of contact with said belt, a stationary track for each belt at the point where said belts lie in a vertical plane, and a single arresting and release mechanism for all of said belts at said point.

6. In a machine for making printing surfaces, the combination with two series of endless moving belts which in their passage toward the front of the machine converge and lie in two vertical planes, of a series of type or matrix bars loosely hung on said belts, the bars on each belt bearing the same character, a finger key for each belt, and escape mechanism for each belt connected with its appropriate finger key, and a common arresting mechanism for all the belts at the point where they lie in two vertical planes.

7. In a machine for assembling matrices or type, the combination with an endless moving carrier of a type or matrix bar permanently connected with said carrier and means for arresting and holding said bar while said carrier continues its motion.

8. The combination with an endless moving belt and a type or matrix bar carried thereby, of a guard approximately parallel with said belt to counteract the effect of centrifugal force on the lower end of said bar.

JOHN R. ROGERS.

Witnesses:
CYRUS E. LOTHROP,
AMELIA J. WILLIAMS.